Aug. 25, 1964  D. W. CRONIN  3,145,487
LIGHT SHOE SOLE ASSEMBLY
Original Filed June 15, 1959
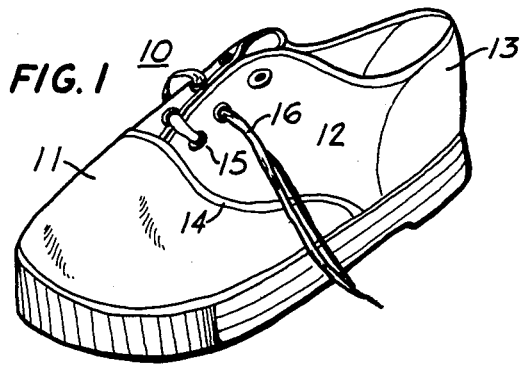
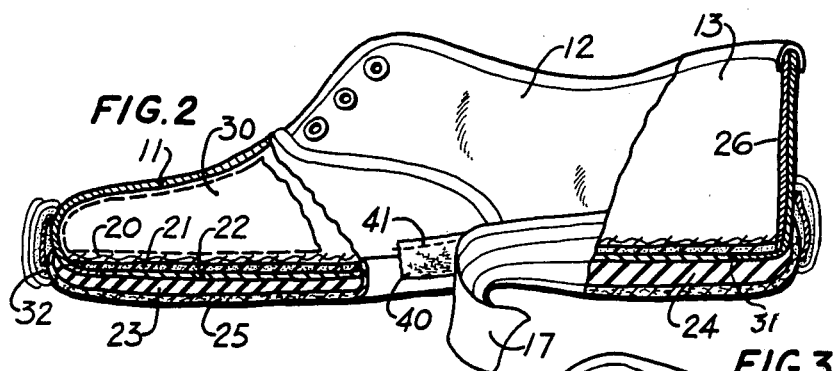
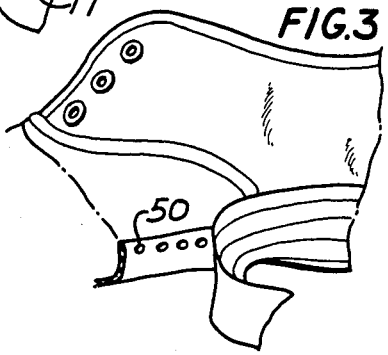
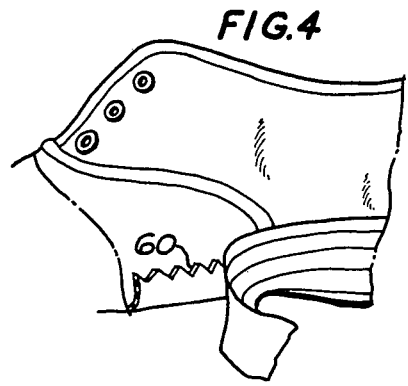
INVENTOR.
DENIS W. CRONIN
BY Thomas B. Graham ns Patent Office 3,145,487
Patented Aug. 25, 1964

3,145,487
LIGHT SHOE SOLE ASSEMBLY
Denis W. Cronin, 140 Chestnut St., Englewood, N.J.
Original application June 15, 1959, Ser. No. 820,282, now Patent No. 2,995,839, dated Aug. 15, 1961. Divided and this application July 28, 1961, Ser. No. 127,578
2 Claims. (Cl. 36—9)

This invention relates to an improvement in footwear and is concerned with the construction and assembly of light shoes, using leather soles which are vulcanized onto a rubber matrix in combination with the uppers of the shoe body.

This application is a division of my copending application SN 820,282, filed June 15, 1959, issued as United States Patent 2,995,839, August 15, 1961.

In the manufacture of shoes of various types, particularly canvas-top shoes (generally classified as "sneakers"), it is a serious problem to develop a product having all the physical properties which are desired. For example, for many purposes, it is desired to have a lightweight flexible leather sole, but, in general that kind of construction technically is inconsistent with economic reality. A leather sole thick enough to protect the foot is too heavy to be inexpensive and is also too heavy for the product desired. A complete rubber sole has some advantages of wear and cost, but it is not suitable for an application which calls for a leather soled shoe.

Therefore, it is a fundamental object of this invention to provide a shoe construction which is characterized by its having a wearing sole formed of leather, laminated and shaped with rubber, which leather is vulcanized to rubber and to the uppers.

It is a further object of the invention to provide a light shoe sole assembly attached to uppers in a manner such that secure adhesion is achieved and delamination is avoided, even under very severe conditions of wear.

Other objects and advantages of the invention will in part be obvious and in part appear hereinafter.

The invention, accordingly, is embodied in a shoe structure and in a method for fabrication of such shoes, and laminating and attaching the soles, the shoe being characterized by having uppers of fundamentally conventional form, an inner sole, vulcanized to an intermediate layer of reclaimed rubber which, in turn, is laminated with a layer of raw rubber, the outer sole layer being of wearing quality leather, all of these being assembled in appropriate relationship, fitted together around a shaping last, and subjected to a vulcanizing operation to form a unitary shoe in which the uppers, the inner sole and the outer layer of leather are all vulcanized to the intermediate rubber layer or filler to form the product, the edges of the outer layer of sole leather being formed to maximize cement contact area between foxing and the uppers of the shoes.

Referring now to the drawings—

FIGURE 1 represents a sketch in perspective of the typical sample of the invention which in this case is embodied in a lightweight canvas top shoe.

FIGURE 2 is a longitudinal section through the shoe to show the construction of the several parts and to show in detail the fabrication of the sole and its relationship to the uppers, and the manner in which the outer sole leather is brought into the structure.

FIGURES 3 and 4 illustrate alternative forms of assembling the shoe sole and foxing.

In FIGURE 1 of the drawing, 10 represents the shoe having a top formed from a forward toe and vamp piece 11, a body piece or instep portion 12, and the heel section or quarter 13. This much is virtually conventional and the parts form the uppers. Trim or binding 14 gives the edges a finish; grommets 15 finish eyelets for lacing 16. The individual parts vary as the styling is varied.

The assembly of uppers is bound to the sole by and under a rubber binding or foxing, which passes entirely around the shoe at the level of the sole, extending a short distance on to the uppers. It is firmly adhered or vulcanized thereto.

The sole, as shown in FIGURE 2, consists of an inner fabric or leather lining 20, somewhat exaggerated in the drawing, under which is a thin layer of sponge rubber 21, which is followed by a thin layer of reclaimed rubber 22. Under the reclaimed rubber is a virgin rubber layer 23, which is formed to provide a somewhat thickened section at the heel 24. The outer layer 25, is a good quality leather to provide an outer wearing surface of at least sufficient wearing quality and abrasive resistance to match the life of the uppers.

To illustrate graphically the manner in which the sole assembly is carried out in accordance with this invention, FIGURE 2 shows heel and toe sections and the mid portion of the shoe with the foxing removed to demonstrate the relationship between the uppers and the sole. It will be apparent in order to achieve the most efficient adhesion between the foxing and the uppers and also to hold all portions of the shoe together, a high grade waterproof adhesive is employed and a strip of woven fabric or gauze 40, which may be cotton or rayon, is interposed between the foxing and the edge of the sole leather. The lamination thus shown in FIGURE 2 consists of the uppers, the edge of the leather brought up to overlap the uppers, the gauze to lap over the edge of the leather and onto the uppers, and over the entire assembly is applied the foxing 17. For most effective adhesion and retention of the leather sole in the shoe body in the form of a unitary structure, it is desirable to sew the strip of gauze 40 to the uppers along a mid line approximating 41, thereby to avoid the possibility of having the gauze slip out from under the foxing during the final vulcanizing assembly operation.

When the shoe is assembled in this fashion, the cement applied around the shoe under the area covered by the foxing has a high affinity for the foxing and the shoe uppers. By providing the structure as shown in this diagram, a sufficient bonding to make the shoe withstand severe physical stress without delamination is achieved.

In FIGURES 3 and 4, alternative versions of treatment of the edge of the leather are shown. These embody in FIGURE 3 the enlargements of the size of the leather piece used as the outer sole to make it come somewhat higher onto the uppers and to provide room for a series of perforations 50 around the edge of said leather. These perforations may be spaced so that essentially 50 percent of the leather along the line of the perforations is removed. When this structure is cemented and assembled under foxing, direct penetration of cement from the foxing through the perforations to the shoe uppers is achieved, thereby strengthening the bond.

In FIGURE 4, the second alternative version is shown wherein the edge of the leather sole is also brought up a fraction of an inch onto the shoe uppers and in this instance, the edge is pinked or notched as shown at 60 or cut along a curvilinear outline to achieve essentially the result illustrated in FIGURE 3. That is, the penetration of cement between the projections of the leather up into the zone between the foxing and body is meticulously achieved by means of the undulating form of edge.

In inspecting the structure of the shoe in detail, it will be observed that the intermediate reclaimed rubber layer 22 is of substantially uniform thickness and terminates a fraction of an inch, about ⅛–⅜ inch, short of the outer edge of the sole so that the uppers 11, 12, 13 in the assembly process may be brought in to underlapping relationship with it. The counter stiffener 26 constituting an insert cemented or sewed to the uppers to give the counter portion form and terminates at about the level of the bend of the uppers to meet the intermediate layer 22. Thus, the sponge layer 21 with the fabric liner 20 butted against it gives the inside of the shoe a neat finish.

The assembly of the shoe requires a series of operations in which, first, after forming the uppers, they are fitted onto a last 30, as shown fragmentarily in FIGURE 2, where the last is indicated in broken section. Thereafter, the sponge inner sole 21 with its liner is fitted into place. Following this the intermediate rubber layer 22 is laid in place and the edges of the uppers shaped around the last to form butt joint 31. Raw rubber sole 24 is then fitted into place and leather sole 25 placed over it. The edges of leather sole 25, may be skived to form a neat tapered fit as indicated at 32, under the foxing. The preferred manner of fitting the leather into place is, of course, shown in FIGURES 3 and 4, where the perforated or shaped edge is fitted under gauze, under the foxing. While holding the entire assembly in this fashion, the operator then applies foxing 17, around the shoe, using as an adhesive a vulcanizable rubber, or other high grade cement.

Externally, in the application of the sole it will be observed the raw rubber of the sole 23 is applied to the reclaimed rubber intermediate sole, as well as the edge of uppers 13 to form a circumferential butt joint 31 going around the shoe. In the application it overlaps the uppers to a substantial extent in a circumference extending around the edge of the shoe as indicated in FIGURE 2.

When the entire shoe is thus assembled around the last, it is enclosed within a heated outer last, which fits over the sole and vulcanizable foxing, and the assembly subjected to pressure and heat to vulcanize the entire package into the single unit shoe. A characteristic feature of the shoe thus is that it has sewing, if any, only in the uppers and the entire bottom is held in assembled relationship by vulcanization.

As materials of construction, the uppers, lining and inner heel may be constructed of fabric or light leather in the manner which is accepted as virtually conventional in the fabrication of shoes. The outer band, or foxing, passing around the shoe is preferably formed of rubber which is cemented in place with a vulcanizable cement and serves to give the product a finished appearance as well as to hold the sole in the completed relationship with the uppers.

The inner sole lining, which comes in contact with the foot, is made of fabric of a grade which is comfortable to wear. The fabric also has a sponge rubber lining under it to provide a proper degree of softness for the foot. The intermediate layer indicated to be of reclaimed rubber in a preferred form may be replaced by fabric, leather or other material of similar wearing quality or thickness since it functions essentially as a spacer to provide a proper degree of uniformity in having the uppers attached to the sole.

The sole itself is formed of the raw rubber and leather outer wearing layer, which wearing layer is actually matched to the uppers and made up of any reasonable quality leather which will give the shoe appropriate wearing qualities. Thus, I have found it possible to assemble an inexpensive light leather shoe, or leather-canvas shoe, in which the wearing and physical qualities of the sole and uppers are matched. In assembling the shoe I am able to achieve unusual economies of fabrication by assembling it around a raw rubber core for the sole.

Though the invention has been described with reference to only a single embodiment, it is to be understood that variations thereof may be adopted without departing from its spirit or scope.

What is claimed is:

1. In a fabric top shoe, a fabric top having an open bottom edge conforming basically to the outline of a foot, an insole fitted within said outline, a layer below said insole matching the thickness of said fabric top and forming a butting joint around the insole, a vulcanized rubber layer applied to said second layer and overlapping said layer to extend onto the upper edge thereof, an outer wearing layer of leather applied to said rubber layer, edges of said leather being extended to overlap said fabric top, and provided with notches, a rubber finish foxing of substantial width extending onto the fabric top, and integral rubber connections extending through the notches in said leather sole and uniting the rubber foxing and said rubber layer.

2. A fabric top shoe in accordance with claim 1, wherein said leather layer is tapered.

References Cited in the file of this patent

UNITED STATES PATENTS

| 1,249,702 | Wiegand et al. | Dec. 11, 1917 |
| 1,622,860 | Cutler | Mar. 29, 1927 |
| 2,038,644 | Cavanagh | Apr. 28, 1936 |
| 2,481,389 | Campagna | Sept. 6, 1949 |